(12) United States Patent
Lin et al.

(10) Patent No.: US 11,555,090 B2
(45) Date of Patent: Jan. 17, 2023

(54) THERMOPLASTIC POLYURETHANE FIBER AND METHOD FOR PRODUCING THE SAME

(71) Applicant: SAN FANG CHEMICAL INDUSTRY CO., LTD., Kaohsiung (TW)

(72) Inventors: Chih-Yi Lin, Kaohsiung (TW); Kuo-Kuang Cheng, Kaohsiung (TW); Kao-Lung Yang, Kaohsiung (TW); Po-Ping Kang, Kaohsiung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 225 days.

(21) Appl. No.: 17/060,383

(22) Filed: Oct. 1, 2020

(65) Prior Publication Data
US 2021/0238338 A1 Aug. 5, 2021

(30) Foreign Application Priority Data
Feb. 5, 2020 (TW) .................... 109103586
Apr. 10, 2020 (TW) .................... 109112231

(51) Int. Cl.
*B29C 48/35* (2019.01)
*C08G 18/38* (2006.01)

(52) U.S. Cl.
CPC .......... *C08G 18/3831* (2013.01); *B29C 48/35* (2019.02)

(58) Field of Classification Search
CPC ..... B29C 48/919; B29C 48/05; B29C 48/345; B29C 48/35; C08G 18/3831
See application file for complete search history.

(56) References Cited

U.S. PATENT DOCUMENTS

| | | | |
|---|---|---|---|
| 4,083,914 A * | 4/1978 | Schippers | B29C 48/305 264/177.17 |
| 5,502,120 A | 3/1996 | Bhatt et al. | |
| 2005/0025966 A1 | 2/2005 | Vedula et al. | |
| 2009/0311529 A1 * | 12/2009 | Zhang | D01D 5/16 428/401 |
| 2020/0010985 A1 | 1/2020 | Park | |

FOREIGN PATENT DOCUMENTS

| | | |
|---|---|---|
| CN | 107916467 A | 4/2018 |
| DE | 19504671 C1 | 6/1996 |
| TW | 201930669 A | 8/2019 |
| TW | 202003692 A | 1/2020 |
| WO | WO-2011006092 A2 * | 1/2011 ............. D01D 5/084 |

* cited by examiner

*Primary Examiner* — Vishal I Patel
(74) *Attorney, Agent, or Firm* — Elmore Patent Law Group, P.C.; Joseph C. Zucchero; Carolyn S. Elmore

(57) ABSTRACT

The present invention relates to a thermoplastic polyurethane fiber and a method for producing the same. A thermoplastic polyurethane material is firstly provided and subjected to a molten extruding process to form a fiber material. Next, an extension process is performed to the fiber material to obtain the thermoplastic polyurethane fiber of the present invention. The thermoplastic polyurethane fiber has a lower thermal shrinking property, thereby meeting requirements of the application.

14 Claims, 3 Drawing Sheets

THERMOPLASTIC POLYURETHANE FIBER AND METHOD FOR PRODUCING THE SAME

RELATED APPLICATIONS

This application claims priority to Taiwan Application Serial Number 109112231, filed Apr. 10, 2020 and Taiwan Application Serial Number 109103586, filed Feb. 5, 2020, all of which are herein incorporated by reference in their entireties.

BACKGROUND

Field of Invention

The present invention relates to a thermoplastic polyurethane fiber. More particularly, a thermoplastic polyurethane fiber with low thermal shrinking property and a method for producing the same are provided.

Description of Related Art

Because thermoplastic polyurethane (TPU) elastomers have excellent recyclability, processability and mechanical properties, the thermoplastic polyurethane elastomers are widely used. Besides, the thermoplastic polyurethane elastomers have good dyeability, therefore the thermoplastic polyurethane elastomers are often processed into fiber materials.

Generally, in order to produce thermoplastic polyurethane fibers, it is necessary to further perform a crosslinking reaction to the thermoplastic polyurethane elastomers, thereby enhancing mechanical properties thereof to meet requirements of fabrics. If the crosslinking reaction was performed in the absence of a crosslinking agent, the produced thermoplastic polyurethane fiber would be more sensitive and easily shrink under high temperature. Accordingly, such thermoplastic polyurethane fiber cannot comply with the requirements of applications. In order to lower thermal shrinking ratio of the thermoplastic polyurethane fiber in the conventional methods, the crosslinking agent is generally added into the crosslinking reaction system to lower the ratio and further enhance mechanical properties of the thermoplastic polyurethane fiber.

Although the crosslinking agent facilitates to lower thermal shrinking ratio of the thermoplastic polyurethane fiber, the requirements of the thermal shrinking ratio are getting more rigorous as applications are diverse. Therefore, the benefits of the crosslinking agent for the thermal shrinkage ratio of the thermoplastic polyurethane fiber have been deficient. Further, recyclability of the thermoplastic polyurethane material produced with the crosslinking agent also substantially lowers.

In view of this, there is an urgent need to provide a thermoplastic polyurethane fiber and a method for producing the same for improving the disadvantages of the conventional thermoplastic polyurethane fiber that cannot have both of thermal shrinking property and recyclability.

SUMMARY

Therefore, one aspect of the present disclosure is providing a method for producing a thermoplastic polyurethane fiber. A thermoplastic polyurethane material is melted to produce the thermoplastic polyurethane fiber. The molten extrusion fiber material is further subjected to an extension process to produce the thermoplastic polyurethane fiber with lower thermal shrinkage ratio.

Another aspect of the present disclosure is providing a thermoplastic polyurethane fiber, which is produced by the aforementioned method.

According to the aforementioned aspect, a method for producing a thermoplastic polyurethane fiber is provided. A thermoplastic polyurethane material is firstly provided, and subjected to a molten extruding process to form a fiber material. An initial melting temperature of the thermoplastic polyurethane material is higher than 120° C., and a peak melting point of the thermoplastic polyurethane material is 170° C. to 200° C. A Shore hardness of the thermoplastic polyurethane material is 35D to 75D. The fiber material includes a monofilament material or a multifilament material. And then, an extension process is performed to the fiber material to form the thermoplastic polyurethane fiber.

According to an embodiment of the present invention, a first extension step is firstly performed, and then a second extension step is performed during the aforementioned extension process. An extension ratio of the second extension step is less than 1, and an extension temperature of the second extension step is 80° C. to 180° C.

According to another embodiment of the present invention, when the aforementioned fiber material is a monofilament material, an extension ratio of the first extension step is 3.5 to 5.5, and an extension temperature of the second extension step is 130° C. to 180° C.

According to yet another embodiment of the present invention, an extension temperature of the aforementioned first extension step is 75° C. to 95° C.

According to yet another embodiment of the present invention, when the fiber material is a multifilament material, the second extension step is performed by at least two pairs of rollers.

According to yet another embodiment of the present invention, when the fiber material is a multifilament material, an extension ratio of the first extension step is 1.2 to 1.8, and the extension temperature of the second extension step is 80° C. to 140° C.

According to yet another embodiment of the present invention, an extension of the aforementioned first extension step is 70° C. to 110° C.

According to yet another embodiment of the present invention, the extension ratio of the aforementioned second extension step is 0.85 to 0.99.

According to the further aspect of the present invention, a thermoplastic polyurethane fiber is provided. The thermoplastic polyurethane fiber is produced by the aforementioned method. A thermal shrinkage ratio of the thermoplastic polyurethane fiber is not larger than 15%.

According to an embodiment of the present invention, the thermal shrinkage ratio of the aforementioned thermoplastic polyurethane fiber is not larger than 10%.

In the thermoplastic polyurethane fiber of the present invention and the method for producing the same, a crosslinking reaction of the thermoplastic polyurethane material is induced in the absence of a crosslinking agent, thereby obtaining the fiber material. Further, the fiber material is processed by the extension process, such that mechanical properties of the fiber material can be modified, and the thermal shrinking property of the thermoplastic polyurethane fiber can be lowered. Moreover, the thermoplastic polyurethane fiber can have much lower thermal shrinking property with multi-stages extension. Besides, the thermoplastic polyurethane fiber produced by the method of the present invention has excellent recyclability due to the lack of the crosslinking agent during the crosslinking reaction.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
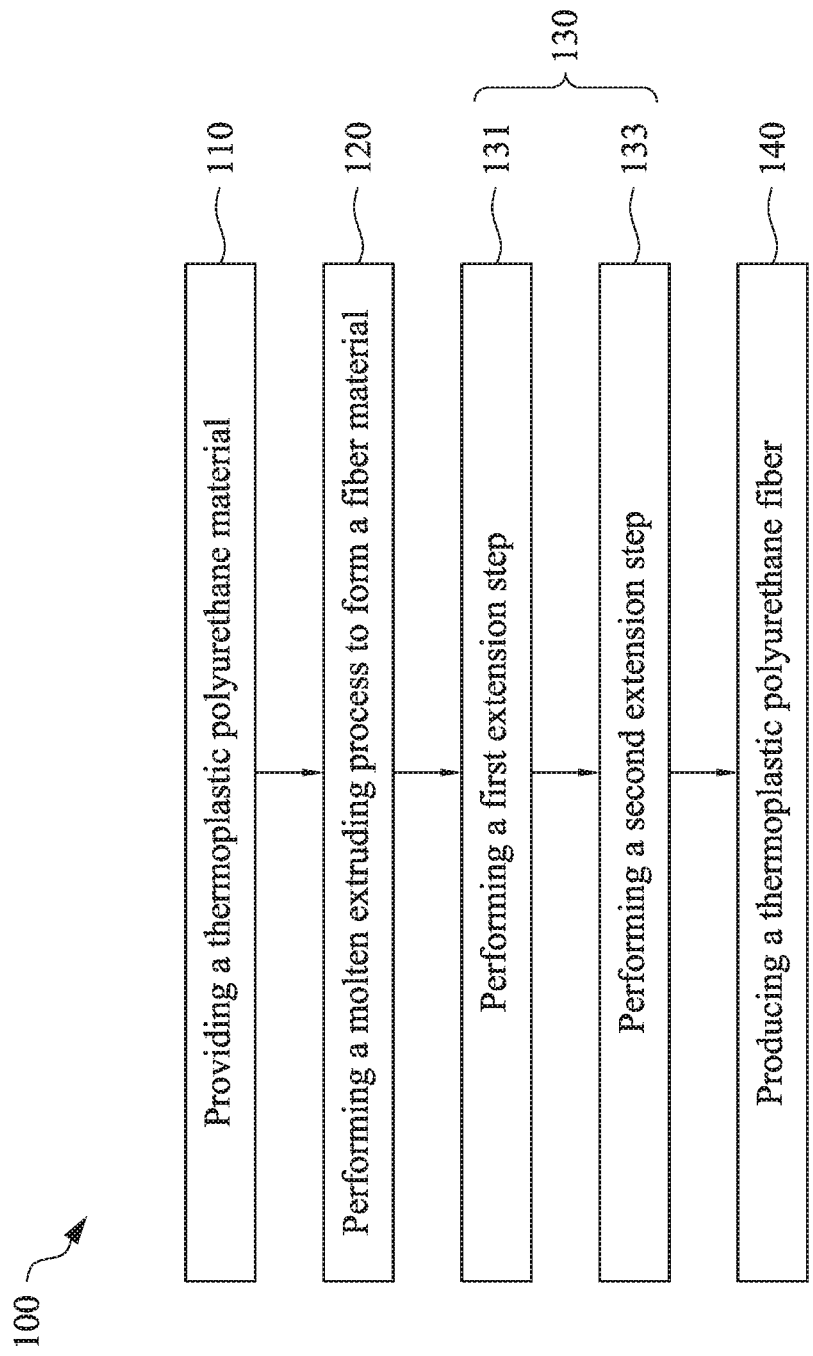
FIG. 1 illustrates a flow chart of a method for producing a thermoplastic polyurethane fiber according to some embodiments of the present invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1. FIG. 1 illustrates a flow chart of a method for producing a thermoplastic polyurethane fiber according to some embodiments of the present invention. In the method 100, a thermoplastic polyurethane material is firstly provided and subjected to a molten extruding process to form a fiber material, as shown in operations 110 and 120.

An initial melting temperature of the thermoplastic polyurethane (TPU) material of the present invention is higher than 120° C., and a peak melting point of the thermoplastic polyurethane material is 170° C. to 200° C. It is noted that the initial melting temperature and the peak melting point are respectively measured by differential scanning calorimetry (DSC), the initial melting temperature represents a temperature where the material starts to absorb heat energy and melt, and the peak melting point represents a peak temperature of a melting endothermic peak of the material. If the initial melting temperature and the peak melting point of the thermoplastic polyurethane material are not in the aforementioned ranges, the thermoplastic polyurethane fiber will not meet the requirements of the application. Preferably, the initial melting temperature of the thermoplastic polyurethane material can be 140° C. to 170° C., and the peak melting point of the thermoplastic polyurethane material can be 180° C. to 200° C. More preferably, the peak melting point of the thermoplastic polyurethane material can be 180° C. to 195° C.

In some embodiments, a Shore hardness of the thermoplastic polyurethane material is 35D to 75D, preferably is 50D to 75D, and more preferably is 60D to 75D. When the Shore hardness of the thermoplastic polyurethane material is in the aforementioned range, the thermoplastic polyurethane fiber can have better mechanical property, therefore meeting the requirements of application.

In the operation 120, the thermoplastic polyurethane material is firstly added into a melting unit of a melt spinning machine, and the thermoplastic polyurethane material is melted by a high temperature to form a molten liquid. Next, the molten liquid is extruded by an extrusion die, thereby forming a fiber material of the present invention. It can be realized that the melting unit applies a temperature higher than a melting point of the thermoplastic polyurethane material to melt the material. Further, parameters of the molten extruding process of the present invention are well known to one skilled in the art rather than focusing or mentioning them in details. Based on types of the extrusion die, the fiber material can be a monofilament material or a multifilament material. In the operation 120, the thermoplastic polyurethane material is subjected to a crosslinking reaction is performed in the absence of a crosslinking agent. In other words, the method for producing the thermoplastic polyurethane fiber of the present invention excludes the crosslinking agent.

After performing the operation 120, an extension process 130 is performed, thereby forming the thermoplastic polyurethane fiber of the present invention (i.e. the operation 140). The extension process 130 is performed the fiber material to extension to adjust properties of the fiber material, such that the thermoplastic polyurethane fiber produced by the method can meet the requirements of the application. During the extension process 130, the fiber material is firstly subjected to a first extension step, and then subjected to a second extension step, shown as in the operations 131 and 133. The first extension step is a master extension stage for the fiber material, and the second extension step is a pre-extension stage for the fiber material. In order to obtain the thermoplastic polyurethane fiber with low thermal shrinkage ratio, an extension ratio of the second extension step for the fiber material is less than 1, and an extension temperature of the second extension step is 80° C. to 180° C. When the extension ratio of the second extension step is less than 1, residual stresses in the fiber material can be efficiently released, thereby lowering the thermal shrinkage ratio of the thermoplastic polyurethane fiber.

If the extension ratio of the second extension step for the fiber material is not less than 1, excessive extension ratio will result extension stresses applied to the fiber in not being efficiently released, therefore being unable to produce the thermoplastic polyurethane fiber of the present invention. Accordingly, the excessive extension ratio will not release internal stresses of the fiber material, thereby thermal setting the fiber material, such that the fiber material produced with excessive extension ratio will not equip with suitable mechanical properties for meeting the requirements of the application. Preferably, the excessive ratio of the second extension step for the fiber material can be 0.85 to 0.99. If the extension temperature of the second extension step for the fiber material is lower than 80° C., the excessively low temperature will weaken effects of the second extension step to the fiber material, such that the thermoplastic polyurethane fiber has high thermal shrinkage. If the extension temperature of the second extension step is higher than 180° C., the fiber material will not endure excessive heat energy, thereby easily resulting in breakage.

Based on types of the fiber material, the aforementioned first extension step and the second extension step respectively extends the fiber with different extension system.

Figure 2:
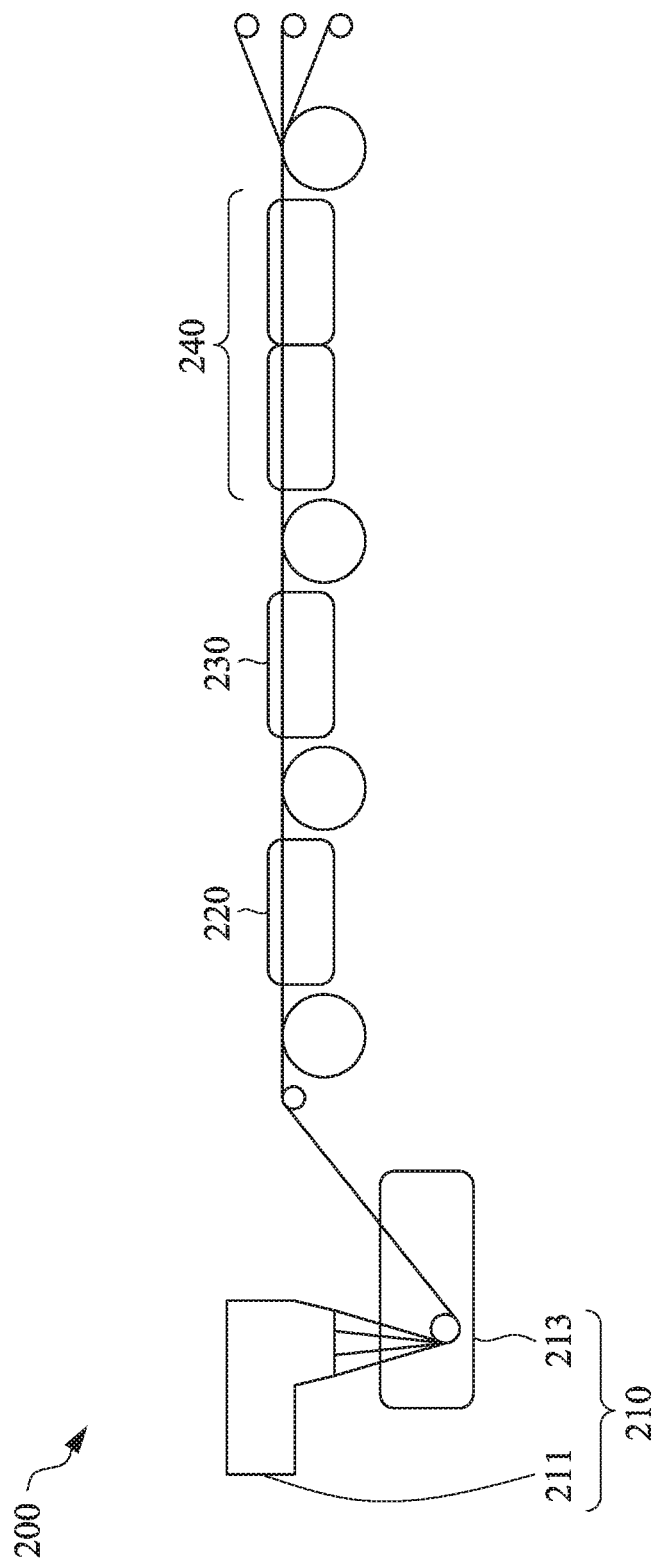
FIG. 2 illustrates the extension system suitable for the monofilament material according to some embodiments of the present invention.

While the fiber material is a monofilament material, simultaneously referring to FIGS. 1 and 2. FIG. 2 illustrates the extension system suitable for the monofilament material according to some embodiments of the present invention. The extension system 200 is suitable for the monofilament material, and the extension system 200 can include a melt spinning machine 210, a hot bath 220, an extension unit 230 and a relaxation unit 240. The melt spinning machine 210 includes a melt spinning unit 211 and a cooling bath 213. In the extension system 200, the thermoplastic polyurethane material is added into the melt spinning unit 211 to be subjected to the aforementioned molten extruding process (i.e. the operation 120). Next, the monofilament material extruded via the extrusion die is firstly cooled by the cooling bath 213, and then is heated by the hot bath 220 to be subjected to the sequential extension process 130.

The monofilament material heated by the hot bath 220 is sequentially subjected to the first extension step of the extension process 130 by the extension unit 230. The monofilament material heated by the hot bath 220 can be 75° C. to 95° C., thereby contributing to subject to the first extension step. That is to say the extension temperature of the first extension step is 75° C. to 95° C. When the extension temperature of the first extension step is 75° C. to 95° C., the monofilament material can be efficiently extended, thereby facilitating to modify properties of the thermoplastic polyurethane fiber. In the extension unit 230, an extension ratio of the monofilament material can be 3.5 to 5.5. When the extension ratio of the monofilament material is in the aforementioned rage, the thermoplastic polyurethane fiber can have excellent mechanical properties.

The monofilament material extruded by the extension unit 230 is further transported to the relaxation unit 240 to be subjected to the aforementioned second extension step of the extension process 130, thereby forming the thermoplastic polyurethane fiber of the present invention. When the second extension step is performed, except for the extension ratio (less than 1) of the operation 133, an extension temperature of the second extension step for the monofilament material can be 130° C. to 180° C. to further obtain better releasing effect of the stresses and prevent the monofilament material from breakage. More preferably, the extension temperature of the second extension step for the monofilament material can be 135° C. to 160° C.

Figure 3:
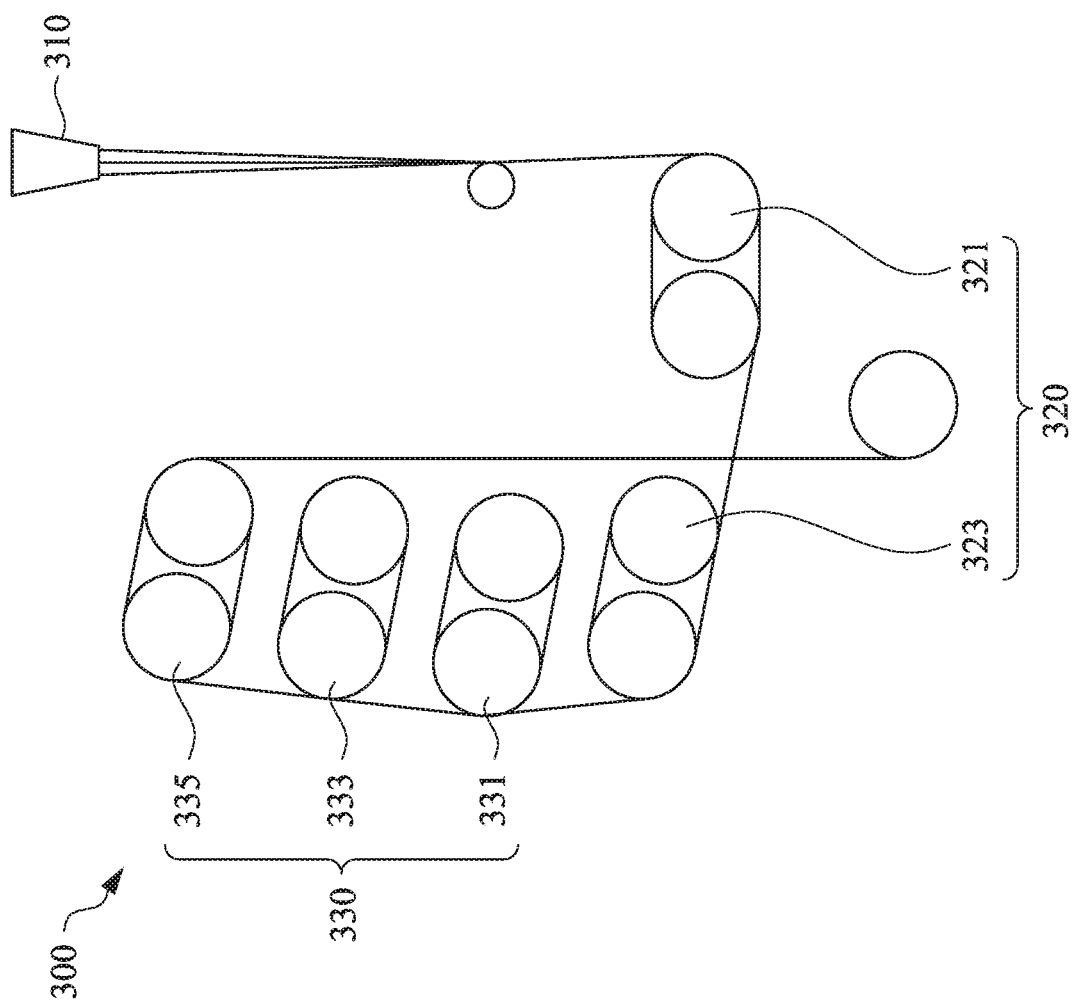
FIG. 3 illustrates the extension system suitable for the multifilament material according to some embodiments of the present invention.

When the fiber material is the multifilament material, simultaneously referring to FIGS. 1 and 3. FIG. 3 illustrates the extension system suitable for the multifilament material according to some embodiments of the present invention. The extension system 300 is suitable to the multifilament material, and the extension system 300 includes an extrusion die 310, an extension unit 320 and a relaxation unit 330. It can be realized that the extension system 300 also includes a melt spinning machine (not being illustrated) well known to one skilled in the art for clearly describing, and the extrusion die is disposed in the melt spinning machine, thereby extruding to for the multifilament material. Because the melt spinning machine is well known to one skilled in the art rather than focusing or mentioning them in details. Moreover, one skilled in the art can realize that the multifilament material extruded by the extrusion die 310 can be cooled by general air-cooling unit. The aforementioned extension unit 320 can include two pairs of extension rollers 321 and 323, and the relaxation unit 330 can include but be not limited to three pairs of relaxation rollers 331, 333 and 335.

Referring to FIGS. 1 and 3, simultaneously. Similar to the description of the aforementioned extension system 200 as shown in FIG. 2, the molten thermoplastic polyurethane material can be used to produce the multifilament material by the extrusion die 310. After air-cooling, the multifilament material is further subjected to the first extension step of the extension process 130 by the extension unit 320. During the first extension step, the multifilament material can be heated to 70° C. to 110° C., and an extension ratio of the pairs of extension rollers 321 and 323 for the multifilament material can be 1.2 to 1.8. During the first extension step, the heated multifilament material is easily to be extruded when the temperature (i.e. the extension temperature of the first extension step) of the multifilament material is in the aforementioned range, therefore leading the thermoplastic polyurethane fiber to meet the requirements of the application. Further, the thermoplastic polyurethane fiber can have better mechanical properties when the extension ratio of the multifilament material is in the above range.

The multifilament material extruded by the pairs of extension rollers 321 and 323 is further transported to the relaxation unit 330 to be subjected to the second extension step, thereby producing the thermoplastic polyurethane fiber of the present invention. Similar to the aforementioned description of the monofilament material, the multifilament material can be further heated to 80° C. to 140° C. to be subjected to the second extension step for obtaining better releasing effect of the stresses and preventing the multifilament material from breakage. More preferably, the temperature of the multifilament material can be 80° C. to 110° C. when the second extension step is performed.

Because the relaxation unit 330 includes three pairs of relaxation rollers 331, 333 and 335, it is noted that the aforementioned extension ratio (less than 1) of the second extension step represents an extension ratio of each pairs of relaxation rollers 331, 333 and 335 for the multifilament material. That is to say the extension ratio of the multifilament material is less than 1 after it is extruded by each pair of rollers 331, 333 and 335. In some embodiments, the extension ratio of each pair of relaxation rollers 331, 333 and 335 for the multifilament material can be the same or different. For example, the extension ratio of the pair of relaxation rollers 331 for the multifilament material can be 0.85, the extension ratio of the pair of relaxation rollers 333 for the multifilament material can be 0.99, and the extension ratio of the pair of relaxation rollers 335 for the multifilament material can be 0.92. In other embodiments, a total extension ratio of the relaxation unit 330 for the multifilament material is less than 1, and preferably is 0.87 to 0.92.

Besides, as shown in FIG. 3, although the relaxation unit 330 includes three pairs of relaxation rollers 331, 333 and 335, it is not to be limited the present invention. The relaxation unit 330 can include two pairs of relaxation rollers, four pairs of relaxation rollers or much more pairs of relaxation rollers. Preferably, the relaxation unit 330 can include two or three pairs of relaxation rollers, and it is noted that the extension ratio of each pairs of relaxation rollers in the relaxation unit 330 for the multifilament material are all less than 1.

In some examples, the thermoplastic polyurethane fiber of the present invention has not larger than 15% of thermal shrinkage ratio after measuring with an evaluation method (ASTM D4974) at 105° C. More preferably, the thermoplastic polyurethane fiber of the present invention has not larger than 10% of thermal shrinkage ratio.

Several embodiments are described below to illustrate the application of the present invention. However, these embodiments are not used for limiting the present invention. For those skilled in the art of the present invention, various variations and modifications can be made without departing from the spirit and scope of the present invention.

Embodiment 1

A thermoplastic polyurethane fiber of Embodiment 1 was produced by a thermoplastic polyurethane elastomer manufactured by BASF (Shore hardness was 65D, and a melting point measured by DSC was 179.6° C.). Then, the thermoplastic polyurethane elastomer was placed in a drying drum, and was dried at 80° C. After 6 hours, a moisture content of the thermoplastic polyurethane elastomer was less than 100 ppm.

Next, a monofilament material of Embodiment 1 was produced by an extension system suitable for the monofilament material. In a melt spinning machine of the extension system, there were five segments between an inlet and extrusion port, and temperatures of the five segments were respectively 180° C., 190° C., 200° C., 205° C. and 205° C. A temperature of a cooling bath was 25° C.

And then, the cooled monofilament material was subjected to a first extension step. A temperature of a hot bath was 80° C., and an extension ratio of the first extension step was 4.7. Thereafter, the extruded monofilament material was subjected to a second extension step, thereby obtaining the thermoplastic polyurethane fiber of Embodiment 1. During the second extension step, a temperature of a relaxation unit was 155° C., and an extension ratio of the second extension step was 1.34.

In the thermoplastic polyurethane fiber of Embodiment 1, fineness was 150D, an elongation was 85% to 115%, strength was 2.5 g/den, and thermal shrinkage ratio measured by ASTM D4974 was 14.8% (measured at 105° C. for 60 seconds).

Embodiment 2

A thermoplastic polyurethane fiber of Embodiment 2 was produced by a thermoplastic polyurethane elastomer manufactured by BASF (Shore hardness was 65D, and a melting point measured by DSC was 179.6° C.). Then, the thermoplastic polyurethane elastomer was placed in a drying drum, and was dried at 80° C. After 6 hours, a moisture content of the thermoplastic polyurethane elastomer was less than 100 ppm.

Next, a monofilament material of Embodiment 2 was produced by an extension system suitable for the monofilament material. In a melt spinning machine of the extension system, there were five segments between an inlet and extrusion port, and temperatures of the five segments were respectively 180° C., 190° C., 200° C., 205° C. and 205° C. A temperature of a cooling bath was 25° C.

And then, the cooled monofilament material was subjected to a first extension step. A temperature of a hot bath was 80° C., and an extension ratio of the first extension step was 4.7. Thereafter, the extruded monofilament material was subjected to a second extension step, thereby obtaining the thermoplastic polyurethane fiber of Embodiment 2. During the second extension step, a temperature of a relaxation unit was 155° C., and an extension ratio of the second extension step was 0.91.

In the thermoplastic polyurethane fiber of Embodiment 2, fineness was 150D, an elongation was 85% to 115%, strength was 2.5 g/den, and thermal shrinkage ratio measured by ASTM D4974 was 4.7% (measured at 105° C. for 60 seconds).

Embodiment 3, Comparative Embodiment 1 and Comparative Embodiment 2

Embodiment 3, Comparative Embodiment 1 and Comparative Embodiment 2 respectively were practiced with the same method as in Embodiment 2 by using various raw materials or extension parameters. The formulations and evaluation results thereof were listed in Table 1 rather than focusing or mentioning them in details.

TABLE 1

|  |  | Embodiment 2 | Embodiment 3 | Comparative Embodiment 1 | Comparative Embodiment 2 |
|---|---|---|---|---|---|
| TPU elastomer | hardness | 65D | 64D | 65D | 98A |
|  | melting point (° C.) | 179.6 | 174 | 180 | 180 |
| drying | temperature (° C.) | 80 | 80 | 80 | 70~90 |
|  | time (hour) | 6 | 6 | 6 | 6~8 |
| temperature of melt spinning machine (° C.) | 1st segment | 180 | 180 | 180 | 180 |
|  | 2nd segment | 190 | 195 | 190 | 190 |
|  | 3rd segment | 200 | 215 | 200 | 200 |
|  | 4th segment | 205 | 213 | 205 | 205 |
|  | 5th segment | 205 | 213 | 205 | 205 |
|  | temperature of cooling bath (° C.) | 25 | 25 | 12 | 12 |
| first step extension | temperature (° C.) | 80 | 78 | 80 | (Unheated) |
|  | extension ratio | 4.7 | 4.3 | 5 | 5 |
| second step extension | temperature (° C.) | 155 | 160 | 120 | 130 |
|  | extension ratio | 0.91 | 0.89 | 1.34 | 1.5 |
| evaluation result | fineness (D) | 150 | 150 | 150 | 150 |
|  | elongation | 85%~115% | 95%~125% | 85%~115% | 85%~115% |
|  | strength (g/den) | 2.5 | 2.8 | 2.5 | 3.3 |
|  | thermal shrinkage ratio (%) | 4.7 | 4.2 | 18.5 | 22.3 |

Embodiment 4

A thermoplastic polyurethane fiber of Embodiment 4 was produced by a thermoplastic polyurethane elastomer manufactured by Lubrizol (Shore hardness was 55D, and a melting point measured by DSC was 167.3° C.). Then, the thermoplastic polyurethane elastomer was placed in a drying drum, and was dried at 70° C. After 6 hours, a moisture content of the thermoplastic polyurethane elastomer was less than 100 ppm.

Next, a multifilament material of Embodiment 4 was produced by an extension system suitable for the multifilament material. In a melt spinning machine of the extension system, there were five segments between an inlet and extrusion port, and temperatures of the five segments were respectively 180° C., 190° C., 200° C., 208° C. and 208° C. A temperature of a cooling air was 13° C.

And then, the cooled multifilament material was subjected to a first extension step. An extension temperature of the first extension step was 86° C., and an extension ratio was 1.42. Thereafter, the extruded multifilament material was subjected to a second extension step, thereby obtaining the thermoplastic polyurethane fiber of Embodiment 4. The second extension step was performed with two pairs of relaxation rollers, and an extension temperature of the second extension step was 108° C. In a first pair of the two pairs of relaxation rollers, a first-stage extension ratio was 0.95. In a second pair of the two pairs of relaxation rollers, a second-stage extension ratio was 0.9. A total extension ratio of the second extension step was 0.855.

In the thermoplastic polyurethane fiber of Embodiment 4, fineness was 150D/24F, an elongation was 85% to 115%, strength was 2.3 g/den, and thermal shrinkage ratio measured by ASTM D4974 was 8.9% (measured at 105° C. for 60 seconds).

Embodiment 5, Embodiment 6 and Comparative Embodiment 3

Embodiment 5, Embodiment 6 and Comparative Embodiment 3 respectively were practiced with the same method as in Embodiment 4 by using various raw materials or extension parameters. The formulations and evaluation results thereof were listed in Table 2 rather than focusing or mentioning them in details.

TABLE 2

| | | Embodiment 4 | Embodiment 5 | Embodiment 6 | Comparative Embodiment 3 |
|---|---|---|---|---|---|
| TPU elastomer | hardness | 55D | 64D | 60D | 95A |
| | melting point (° C.) | 167.3 | 174 | 173.4 | 162.7 |
| drying | temperature (° C.) | 70 | 80 | 75 | 70~90 |
| | time (hour) | 6 | 6 | 6 | 6~8 |
| temperature of melt spinning machine (° C.) | 1st segment | 180 | 185 | 185 | 180 |
| | 2nd segment | 190 | 200 | 200 | 205 |
| | 3rd segment | 200 | 210 | 210 | 215 |
| | 4th segment | 208 | 213 | 213 | 215 |
| | 5th segment | 208 | 213 | 213 | 215 |
| temperature of cooling air (° C.) | | 13 | 16 | 13 | 18 |
| first extension step | temperature (° C.) | 86 | 110 | 104 | (Unheated) |
| | extension ratio | 1.42 | 1.8 | 1.68 | 2.2 |
| second extension step | temperature (° C.) | 108 | 140 | 123 | 78 |
| | first-stage extension ratio | 0.95 | 0.98 | 0.97 | (performed without mult-stages) |
| | second-stage extension ratio | 0.9 | 0.98 | 0.94 | |
| | total extension ratio | 0.855 | 0.96 | 0.9118 | 0.96 |
| evaluation result | fineness (D/24F) | 150 | 150 | 150 | 150 |
| | elongation | 85%~115% | 75%~105% | 80%~110% | 85%~115% |
| | strength (g/den) | 2.3 | 2.5 | 2.2 | 2.4 |
| | thermal shrinkage ratio (%) | 8.9 | 6.4 | 7.2 | 19.4 |

Based on Table 1, in Embodiment 2 and Embodiment 3, the monofilament materials are treated by the second extension step with the extension ratio less than 1, thereby efficiently releasing internal residual stresses of the monofilament materials, and the thermoplastic polyurethane fiber can have thermal shrinkage ratio less than 10%. Further, because the first extension step of Comparative Embodiment 2 does not comprise the thermal extension, the thermoplastic polyurethane fiber has a higher thermal shrinking ratio, thereby being hard to meet the requirements.

Based on Table 2, similarly, the multifilament materials of Embodiment 4 to Embodiment 6 are respectively treated by the second extension step with the extension ratio less than 1, such that the thermoplastic polyurethane fibers have thermal shrinking ratio less than 10%. According to Embodiment 4 to Embodiment 6 and Comparative Embodiment 3, thermal shrinking ratios of the thermoplastic polyurethane fiber can be lowered to less than or equal to 10% by multi-stages extension of the second extension step (i.e. Embodiment 4 to Embodiment 6).

As above discussion, the method for producing the thermoplastic polyurethane fiber of the present invention is performed the extension process to the monofilament material and/or the multifilament material without adding the crosslinking agent, thereby subjecting the thermoplastic polyurethane fiber to equip with thermal shrinking ratio not larger than 15% and excellent mechanical properties. Moreover, when the monofilament material and/or the multifilament material is treated by the extension step with specific extension ratio and temperature, residual stresses in the materials can be efficiently released, such that the thermoplastic polyurethane fiber can have thermal shrinking ratio not larger than 10% and excellent mechanical properties. Further, the thermal shrinking ratio of the thermoplastic polyurethane fiber can efficiently be lowered by multi-stages extension so as to meet the requirements of the application. In addition, because the crosslinking reaction of the thermoplastic polyurethane material is performed without adding the crosslinking agent, the thermoplastic polyurethane fiber produced by molten extruding has excellent recyclability.

As is understood by a person skilled in the art, the foregoing preferred embodiments of the present invention are illustrated of the present invention rather than limiting of the present invention. In view of the foregoing, it is intended to cover various modifications and similar arrangements included within the spirit and scope of the appended claims. Therefore, the scope of which should be accorded the broadest interpretation so as to encompass all such modifications and similar structure.

What is claimed is:

1. A method for producing a thermoplastic polyurethane fiber, comprising:
   providing a thermoplastic polyurethane material, wherein an initial melting temperature of the thermoplastic polyurethane material is higher than 120° C., a peak melting point of the thermoplastic polyurethane material is 170° C. to 200° C., and a Shore hardness of thermoplastic polyurethane material is 35D to 75D;
   performing a molten extruding process to the thermoplastic polyurethane material to form a fiber material, wherein the fiber material includes a monofilament material or a multifilament material; and
   performing an extension process to the fiber material to form the thermoplastic polyurethane fiber, wherein the extension process comprises:
   performing a first extension step; and
   performing a second extension step, wherein an extension ratio of the second extension step is less than 1, and an extension temperature of the second extension step is 80° C. to 180° C.

2. The method for producing the thermoplastic polyurethane fiber of claim 1, wherein when the fiber material is the monofilament material, an extension ratio of the first extension step is 3.5 to 5.5, and the extension temperature of the second extension step is 130° C. to 180° C.

3. The method for producing the thermoplastic polyurethane fiber of claim 1, wherein an extension temperature of the first extension step is 75° C. to 95° C.

4. The method for producing the thermoplastic polyurethane fiber of claim 1, wherein when the fiber material is the multifilament material, the second extension step is performed by at least two pairs of rollers.

5. The method for producing the thermoplastic polyurethane fiber of claim 1, wherein when the fiber material is the multifilament material, an extension ratio of the first extension step is 1.2 to 1.8, and the extension temperature of the second extension step is 80° C. to 140° C.

6. The method for producing the thermoplastic polyurethane fiber of claim 5, wherein an extension temperature of the first extension step is 70° C. to 110° C.

7. The method for producing the thermoplastic polyurethane fiber of claim 1, wherein the extension ratio of the second extension step is 0.85 to 0.99.

8. A thermoplastic polyurethane fiber produced by a method, wherein a thermal shrinkage ratio of the thermoplastic polyurethane fiber is not larger than 15%, and the method comprises:
  providing a thermoplastic polyurethane material, wherein an initial melting temperature of the thermoplastic polyurethane material is higher than 120° C., a peak melting point of the thermoplastic polyurethane material is 170° C. to 200° C., and a Shore hardness of thermoplastic polyurethane material is 35D to 75D;
  performing a molten extruding process to the thermoplastic polyurethane material to form a fiber material, wherein the fiber material includes a monofilament material or a multifilament material; and
  performing an extension process to the fiber material to form the thermoplastic polyurethane fiber, wherein the extension process comprises:
    performing a first extension step; and
    performing a second extension step, wherein an extension ratio of the second extension step is less than 1, and an extension temperature of the second extension step is 80° C. to 180° C.

9. The thermoplastic polyurethane fiber of claim 8, wherein when the fiber material is the monofilament material, an extension ratio of the first extension step is 3.5 to 5.5, and the extension temperature of the second extension step is 130° C. to 180° C.

10. The thermoplastic polyurethane fiber of claim 8, wherein an extension temperature of the first extension step is 75° C. to 95° C.

11. The thermoplastic polyurethane fiber of claim 8, wherein when the fiber material is the multifilament material, the second extension step is performed by at least two pairs of rollers.

12. The thermoplastic polyurethane fiber of claim 8, wherein when the fiber material is the multifilament material, an extension ratio of the first extension step is 1.2 to 1.8, and the extension temperature of the second extension step is 80° C. to 140° C.

13. The thermoplastic polyurethane fiber of claim 12, wherein an extension temperature of the first extension step is 70° C. to 110° C.

14. The thermoplastic polyurethane fiber of claim 8, wherein the extension ratio of the second extension step is 0.85 to 0.99.

* * * * *